March 17, 1936.　　B. A. JONES ET AL　　2,034,658
VISCOMETER
Filed Nov. 22, 1933　　2 Sheets-Sheet 1
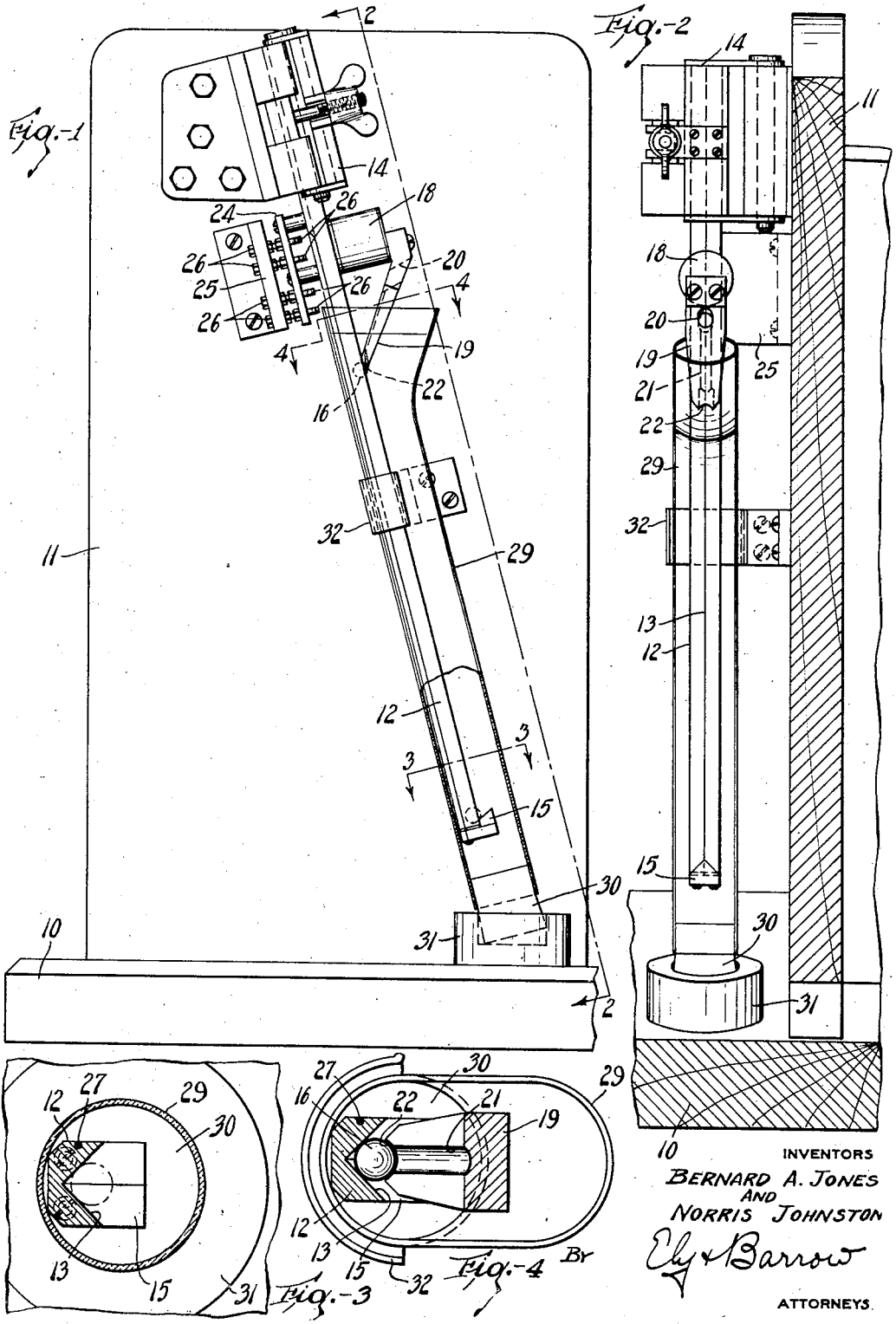
INVENTORS
BERNARD A. JONES
AND
NORRIS JOHNSTON
By Ely & Barrow
ATTORNEYS.

Patented Mar. 17, 1936

2,034,658

UNITED STATES PATENT OFFICE 2,034,658

VISCOMETER

Bernard A. Jones and Norris Johnston, Cuyahoga Falls, Ohio, assignors to The Firestone Tire and Rubber Company, Akron, Ohio, a corporation of Ohio Application November 22, 1933, Serial No. 699,166

12 Claims. (Cl. 265—11)

This invention relates to viscometers such as may be used for determining the viscosities of highly viscous fluids, and more especially it relates to viscometers of the falling ball type.

The chief objects of the invention are to provide an instrument of the character mentioned that will measure accurately the relative viscosity of a large number of viscous fluids; that will eliminate the personal factor in determining the time of fall of the ball; that is economical in the use of the material being tested; that is rapid in yielding reliable results; that provides convenience and simplicity of handling; that is relatively low in initial cost; and that will give data that are susceptible of mathematical treatment so that absolute viscosities may be obtained. Another object is to provide an instrument capable of giving viscosity readings for any viscous fluid, opaque or transparent, except those fluids characterized by their electrical conductivity. A further object is to provide an instrument of the character mentioned that will be sufficiently sensitive to operate on low electric current so that arcing across electrical contacts is avoided.

Of the accompanying drawings:

Figure 1 is a front elevation of the mechanical elements of apparatus embodying the invention, parts being broken away and in section;

Figure 2 is a section on the line 2—2 of Figure 1;

Figure 3 is a section on the line 3—3 of Figure 1;

Figure 4 is a section on the line 4—4 of Figure 1; and

Figure 5:
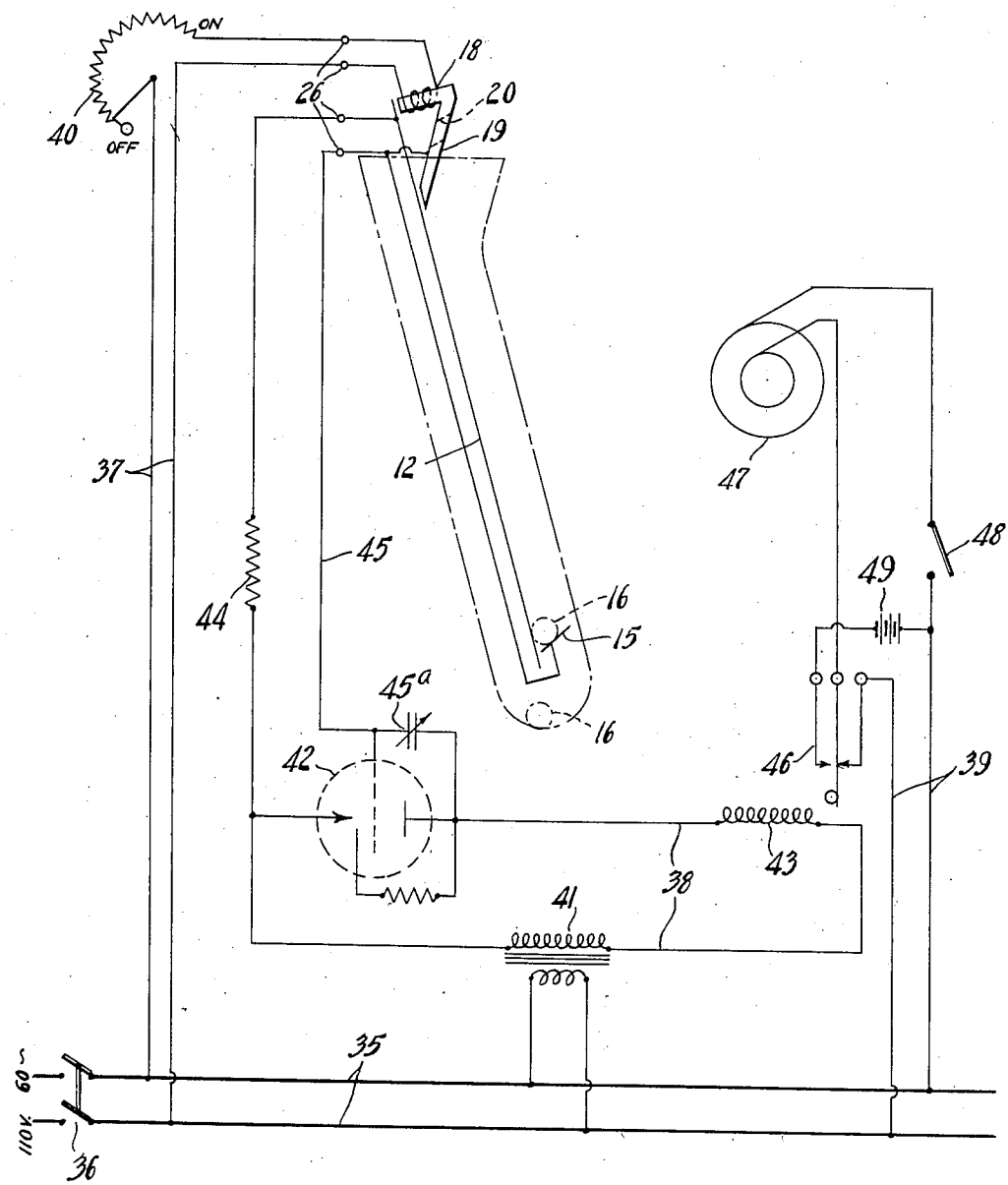
Figure 5 is an electrical wiring diagram of the apparatus embodying the invention.

Referring to Figures 1 to 4 of the drawings, 10 is a baseboard and 11 is a vertical backboard or panel upon which the mechanical elements of the apparatus are mounted. Said apparatus comprises a metal guide or slide 12, one side of which is formed with a longitudinal 90° groove 13, the slide being supported from its upper end by a clamp-bracket 14 from which it may be easily removed for cleaning. The clamp-bracket is so positioned that it supports the slide 12 at an inclination of 15° from vertical, with its grooved face 13 uppermost, but experience has shown that the apparatus will work substantially as well if the slide is disposed at any angle of from 1° to 30° inclination from vertical.

Secured to the lower end of the slide 12 is a contact foot or abutment 15 that is electrically insulated from the slide. The said foot 15 has a tapered, wedge-shaped, upper portion as is most clearly shown in Figures 1 and 2, the arrangement being such as to facilitate the making of electrical contact with a steel ball, such as the ball 16, which may slide or roll down the slide 12. Several of the balls 16 may be provided, all of them being of the same size within close limits. In practice it is found that balls of ⅜" diameter give satisfactory results and are easy to handle.

Mounted upon the upper end of the slide 12, below the bracket 14, is a magnetic device for retaining the ball 16 at the upper end of the slide, and for releasing it when desired. Said magnetic device comprises an electro-magnet 18 that is mounted upon the grooved side of the slide, and insulated from the latter. A pole piece 19 is secured to the core of the magnet 18 and extends obliquely downwardly therefrom to a point adjacent the slide 12. Near its upper end the pole piece 19 is formed with an aperture 20 through which a ball 16 may be passed, and the rear face of the pole piece is formed with a shallow groove 21, Figure 4, for guiding the ball as it rolls downwardly to the groove 13 in slide 12.

The lower end of the pole piece 19 is formed with an arcuate groove 22 of substantially the same radius as the ball 16, the arrangement being such that a ball 16 in the grooved slide 12 will have sufficient clearance to pass easily under the free end of pole piece 19, but will be sufficiently close to the latter to be held in determinate position thereat by the attractive force of the magnet 18. The distance between the lower end of the pole piece 19 and the foot 15 has been more or less arbitrarily fixed at 12 inches. This distance is long enough to provide accuracy in results and short enough to keep the amount of fluid required for test fairly low.

Mounted upon the rear face of the slide 12, near the upper end thereof, is one member 24 of an electrical connector plug of the pin and jack type, comprising members 24, 25, the latter being mounted upon the backboard 11. The arrangement is such as to facilitate the removal of the slide 12 for cleaning. Of the four terminals 26 of connector 24, two are electrically connected to magnet 18, one is connected to slide 12, and one is connected to pole piece 19 and to foot 15. The electrical conductor to the latter may be run in a groove 27 extending longitudinally of one lateral face of slide 12 and insulated therefrom.

For holding the fluid, the viscosity of which is to be determined, there is provided a tube 29, the lower end of which is closed by a removable plug 30, the upper end of the tube preferably being flared as shown to facilitate the pouring of fluid thereinto. At its lower end the tube 29 is supported in a suitable cup 31 mounted on the baseboard 10, and near its upper end the tube is embraced by a spring clip 32 secured to the backboard 11. Said supports hold the tube in inclined position at the same angle as that of the slide 12, and when the latter and the tube are in operative position the slide is disposed inside the tube. The length of the tube is about 15 inches, and when it is substantially filled with fluid the level of the latter is above the lower end of pole piece 19, where the ball 16 is held. Applicants' apparatus for determining viscosity of fluid by the falling ball method does not require that the ball be visible during operation, so that the tube 29 may be of metal such as brass or aluminum if strength is desired. Ease of cleaning is an important consideration and for this reason the tube preferably is made of glass, such as the glass sold under the trade name of "Pyrex".

Referring now to Figure 5 of the drawings, it will be seen that the apparatus is electrically operated from a main power line 35 of 110 volts, 60 cycles, alternating current, there being a main switch 36 in said line. The apparatus comprises three circuits that are operated from the power line 35, namely, a magnet circuit 37, a grid glow circuit 38, and a clock circuit 39. The magnet circuit 37 is connected with the electo-magnet 18 for energizing the same, so that a ball 16 may be retained at the tip of the pole piece 19 through the tractive effort of the magnet. The circuit 37 includes a 5000 ohm rheostat 40 for the purpose of gradually diminishing the current through the magnet to such a low value that the ball 16 will fall by gravity, away from said pole piece.

Current through rheostat never reaches zero value, with the result that current through the magnet cannot be turned completely off at the moment of magnetic saturation, which would leave the magnet with a high value of permanent magnetism and thus prevent the ball from leaving the pole piece. The grid glow circuit is connected with the power line 35 through a transformer 41 that steps up the current to 220 volts. The grid glow circuit 38 includes a standard grid glow tube 42 and a 6000 ohm relay 43. One side of the line of circuit 38 extends through a resistance coil 44 of one megohm capacity to the slide 12, and the pole piece 19 and foot 15 are connected through conductor 45 with the grid glow tube as shown. The relay 43 operates a switch, generally designated 46, in the clock circuit 39. The magnet circuit 37 and grid glow circuit 38 are connected to the mechanical apparatus through the connectors 26. A variable condenser 45a may be interposed between the control grid and the cathode of grid glow tube 42 to balance the capacity of circuit 46 and reduce sparking at contact foot 15.

The clock circuit 39 comprises an electric clock 47, a manually operated switch 48, a relay switch 46, a 22½ volt battery 49 for operating an electric brake on the clock 47, said braking action consisting of the magnetic drag on the clock rotor occasioned by a direct field current. The relay switch 46 is so positioned in the circuit as to connect the clock alternatively with the 110 volt power line 35 or with the battery 49 according to the condition of relay 43 in the grid glow circuit.

The various electrical instruments enumerated in connection with the description of the wiring diagram are standard instruments and need not be described in detail. They are mounted upon an instrument panel (not shown) which may be more or less removed from the mechanical apparatus shown in Figures 1 to 4.

The operation of the apparatus is as follows. The main switch 36 and clock switch 48 being open and the rheostat 40 being turned to "off" position as shown, the slide 12, magnet 18, and tube 29 in thoroughly clean and dry condition are assembled as shown upon the backboard 11. The tube 29 is then filled with the viscous fluid to be tested, the top of the fluid being at least one inch above the lower end of the pole piece 19. The main line switch 36 is then closed, which causes a faint glow to be visible in the grid glow tube. The clock switch 48 is then closed which starts the clock to running, the switch being turned off when the clock hand reaches zero. If the clock hand coasts past zero it is manually moved to that point. The rheostat 40 is then turned to "on" position and excitation of the magnet 18 may be checked by touching a ball 16 to the pole piece 19. If the magnet is operating correctly, a 60 cycle vibration will be felt through the ball and the pole piece. With the rheostat in "on" position, a ball 16 is dropped through aperture 20 in the pole piece. As soon as the ball reaches the tip of the pole piece, which may take a few seconds depending upon the viscosity of the fluid, it makes contact with the slide 12 and thus closes the grid glow circuit, with the result that the glow in the grid glow tube becomes much larger and brighter, and the relay 43 is operated to throw the switch 46 whereby the battery 49 is connected to the clock 47 to operate the magnetic brake therein. The apparatus is now ready for the test.

The clock switch 48 is then closed, and the rheostat 40 turned to "off" position, with the result that the magnet 18 releases the ball 16, the latter then moving down the slide 12 by gravity, the progress of the ball being impeded by the viscous fluid in which the slide is immersed. At the instant the ball leaves the pole piece, the grid glow circuit opens and the glow in the grid glow tube diminishes to a small, dim red light, the relay 43 operating concurrently to put the switch 46 in its alternative position whereby the connection of the clock 47 to battery 49 is opened and connection is made with power line 35 to run the clock.

The clock stops as soon as the ball 16 touches the foot 15, which again closes the grid glow circuit and causes the grid glow tube to glow brightly, and causes the relay 43 to operate the switch 46 whereby current to the clock 47 is cut off and the brake applied. This completes one cycle of operation. The elapsed time as indicated by the clock should then be recorded. If it is desired to check the result obtained, the ball is removed from the foot 15 by tilting the apparatus sufficiently to cause the ball to roll off said foot and fall to the bottom of the tube 29. The operation described may then be repeated with another ball. The reading of the clock in seconds is recorded as the "rolling ball" viscosity in seconds.

The slide, tube and balls require to be thoroughly cleaned before the viscous fluid is poured into the tube. The data obtained by use of the apparatus may be used for determining relative viscosities of various fluids, or by suitable mathematical treatment they may be used for determining absolute viscosities.

The apparatus has been found to be of great utility in the rubber industry in connection with various rubber cements. The control of cement manufacture has been made more precise, whereby the quality of the cements is improved. Because the viscosities of cements may be controlled within much closer limits than heretofore has been possible, there is a direct saving in rubber. The invention permits viscosity determinations to be made in less time than heretofore, and it achieves the other advantages set out in the foregoing statement of objects.

Modification may be made without departing from the spirit of the invention or the scope of the appended claims.

What is claimed is:

1. In a viscometer, the combination of a receptacle for fluid, two spaced-apart, upper and lower fixed points in said fluid, a ball therein movable by gravity from one of said points to the other and adapted to make physical contact with each of them, means for directing said ball in a determined path between said points, a clock, and means for automatically starting the clock when the ball breaks contact with the upper point and for stopping the clock when the ball makes contact with the lower point.

2. In a viscometer, the combination of a receptacle for fluid, an inclined slide in said fluid, a ball movable by gravity down said slide, a clock, and means automatically starting the clock when the ball breaks physical contact with a determinate point at the top of the slide and stopping the clock when the ball makes physical contact with a determinate point nearer the bottom of the slide.

3. In a viscometer, the combination of a receptacle for fluid, an inclined slide therein, a ball movable by gravity down the slide, an electrical clock, and spaced electrical contacts on the slide in the path of the ball, an electrical circuit connecting said contacts and said clock, said contacts respectively controlling the starting and stopping of the electrical clock whereby the clock operates during the interval that the ball is moving from one contact to the other.

4. In a viscometer, the combination of a receptacle for fluid, an inclined slide therein, a ball movable by gravity down said slide, an electrical clock, electrical contacts at spaced points longitudinally of the slide, below the level of the fluid therein, said contacts being electrically connected to said clock, said electrical contacts being in the path of the ball and controlling the operation of the clock, and means for retaining the ball at the upper contact and for releasing it therefrom.

5. In a viscometer, the combination of a receptacle for fluid, an inclined slide therein, a ball movable by gravity down said slide, an electrical clock, electrical contacts at the upper and lower ends of the slide, below the level of the fluid therein, said contacts being electrically connected to said clock, said contacts being in the path of the ball and controlling the operation of the clock whereby the latter runs when the ball is intermediate said contacts, and magnetic means for retaining the ball at the upper contacts.

6. In a viscometer, the combination of a receptacle for fluid, two vertically spaced apart pairs of electrical contacts therein, an electrical clock electrically connected to said contacts, a ball movable by gravity from one pair of contacts to the other and closing the respective contacts when engaged therewith, and an electromagnet associated with the upper contacts for holding the ball thereat and for releasing it therefrom.

7. In a viscometer, the combination of a receptacle for fluid, a grid glow electrical circuit comprising a grid glow tube and a relay, said circuit having two pairs of electrical contacts disposed within the fluid in the tube, a ball in said fluid movable by gravity from one pair of said contacts to the other to close the same, and an electrical clock controlled by said relay.

8. A combination as defined in claim 7 including an electric brake for the clock, said brake being controlled by said relay.

9. In a viscometer, the combination of a receptacle for fluid, a grid glow electrical circuit comprising a grid glow tube and a relay, said circuit having two pairs of electrical contacts disposed within the fluid, a metal ball, means for guiding the latter in a determinate course in said fluid from one pair of contacts to the other for closing said respective pairs of contacts when engaged therewith, an electrical clock including an electrical brake therefor, a clock circuit for providing current to operate the clock and the brake, and a switch in said circuit for alternatively supplying power to the clock or to the brake, said switch being controlled by the relay in the grid glow circuit.

10. A combination as defined in claim 9 including a battery in the clock circuit for operating the brake thereof.

11. In a viscometer, the combination of a receptacle for fluid, two vertically spaced-apart pairs of electrical contacts therein, an electrical clock electrically connected to said contacts, a ball movable by gravity from one pair of contacts to the other and closing the respective contacts when engaged therewith, an electromagnet associated with the upper pair of contacts for holding the ball thereat and releasing it therefrom, and a magnetic circuit including a rheostat for energizing the electromagnet.

12. A viscometer comprising a receptacle for viscous fluid, an inclined grooved slide therein, a ball movable down said slide by gravity, electrical contacts at spaced points on the slide, said contacts being insulated from the slide and so spaced therefrom that the ball in moving down the slide will make an electrical connection between the said contacts and the slide, and an electrically operated device responsive to said electrical connections.

BERNARD A. JONES.
NORRIS JOHNSTON.